(12) United States Patent
Rydbeck et al.

(10) Patent No.: US 6,751,487 B1
(45) Date of Patent: Jun. 15, 2004

(54) TURN AROUND CELLULAR TELEPHONE

(75) Inventors: Nils Rydbeck, Cary, NC (US); David Townsend, Chapel Hill, NC (US); Harou Kurokawa, Morrisville, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/500,369

(22) Filed: Feb. 8, 2000

(51) Int. Cl.⁷ ................................................ H04M 1/00
(52) U.S. Cl. ................. 455/575.3; 455/575.1; 455/550.1; 455/90.3; 379/433.04
(58) Field of Search ............................. 455/550, 90, 566, 455/575.1, 351, 550.1, 90.3; 379/433.1, 434, 428.1

(56) References Cited

U.S. PATENT DOCUMENTS

| | | | |
|---|---|---|---|
| 3,857,022 A | | 12/1974 | Rebane et al. ............... 233/151 |
| 5,384,844 A | * | 1/1995 | Rydbeck |
| 5,565,894 A | | 10/1996 | Bates et al. |
| 5,584,054 A | | 12/1996 | Tyneski et al. |
| 5,917,906 A | | 6/1999 | Thornton |
| 6,009,336 A | * | 12/1999 | Harris et al. |
| 6,044,153 A | * | 3/2000 | Kaschke |
| 6,065,187 A | * | 5/2000 | Mischenko |
| 6,161,140 A | * | 12/2000 | Moriya |
| 6,448,490 B1 | * | 9/2002 | Katz |

OTHER PUBLICATIONS

Abstract, Illustrations of samples of communication devices, Official Gazette, p. 2980 (Nov. 9, 1999).
Palm VII Connected Organizer, ©1999 3Com Corporation, http://www.palm.com/products/palmvii2/index.html (Dec. 23, 1999).

* cited by examiner

Primary Examiner—Sinh Tran
Assistant Examiner—Huy D Nguyen
(74) Attorney, Agent, or Firm—Myers Bigel Sibley & Sajovec

(57) ABSTRACT

A miniaturizable wireless communications device is configured to redefine the roles of the primary front and rear surfaces of the device by positioning a large graphic display on the forward surface and a speaker on the rear surface. The associated keypad can be disposed on either or both of the rear surface or the graphic display (such as via a touchscreen). Alternatively, a pivotable flip can include the keypad and even the microphone. During operation, a user can turn the device around to orient the desired input surface for use (forward face up for display surface use and forward face down or away for telephone use). An associated method of designing the operational platform of a wireless communications device so that it has two active primary faces is also disclosed.

23 Claims, 9 Drawing Sheets

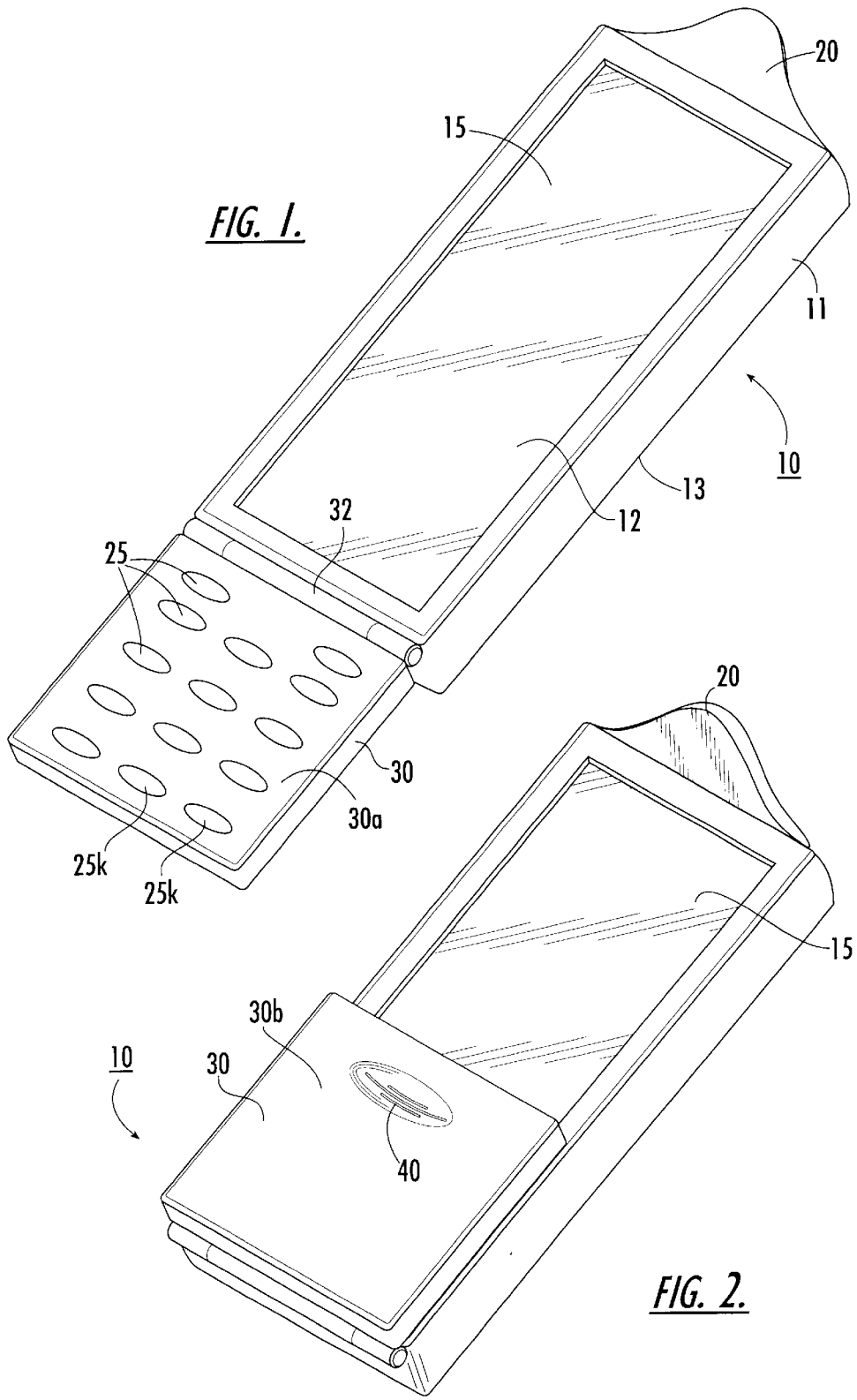

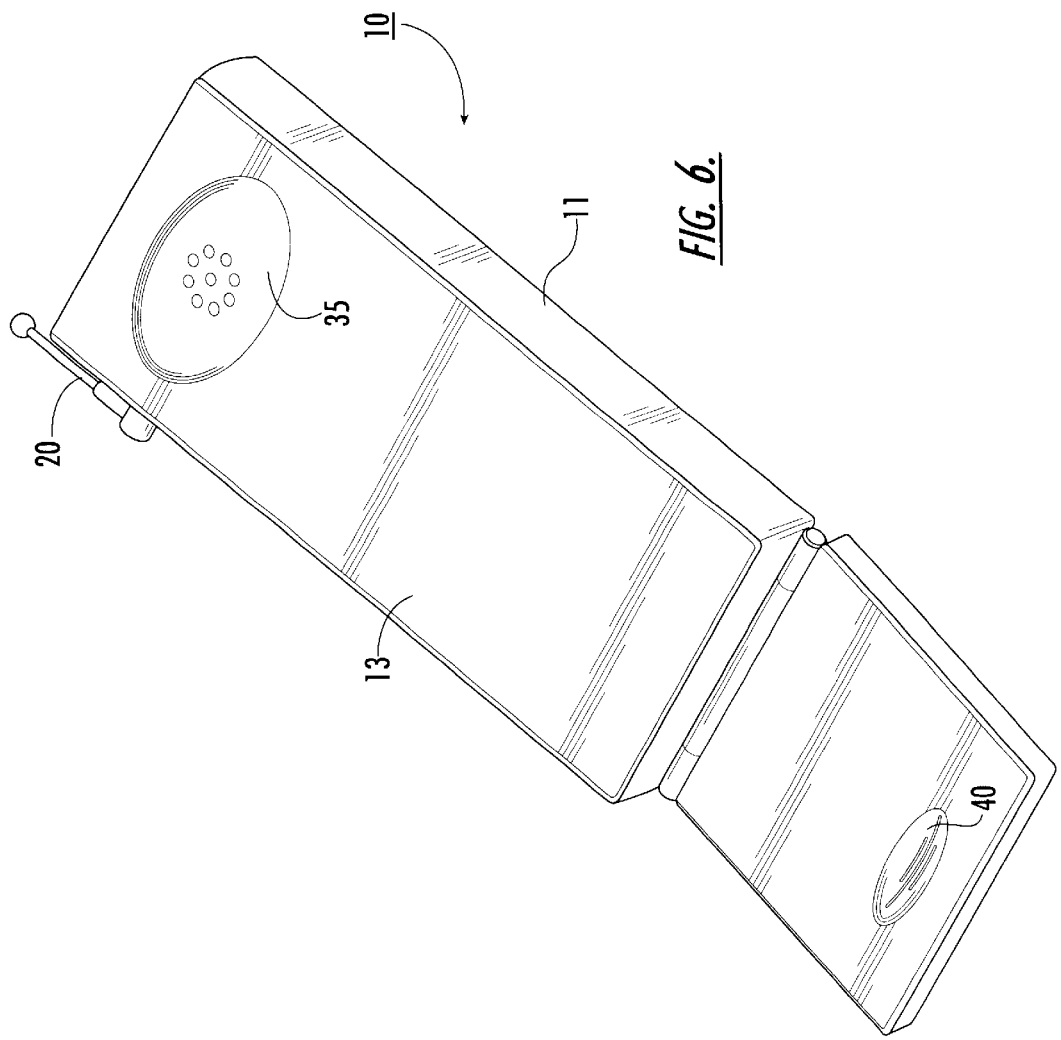

```
┌─────────────────────────────────────────────────────────────────┐
│ A METHOD FOR MANUFACTURING PORTABLE COMMUNICATIONS DEVICES      │
│ HAVING AN OPERATIONAL PLATFORM WHICH DEFINES ACTIVE             │
│ OPERATIONAL ROLES FOR EACH OF THE TWO OPPOSING FORWARD          │
│ AND REAR MAJOR SURFACES.                                        │
└─────────────────────────────────────────────────────────────────┘
                              ↓
┌─────────────────────────────────────────────────────────────────┐
│ PROVIDING A BODY WITH THE FIRST FORWARD MAJOR SURFACE           │
│ CONFIGURED TO HOLD A GRAPHIC DISPLAY WHICH EXTENDS TO COVER     │
│ A MAJOR PORTION OF THE FIRST MAJOR SURFACE SUCH THAT A USER     │
│ WILL ORIENT THE FIRST FORWARD MAJOR SURFACE AS THE FRONT        │
│ SURFACE DURING USES INVOLVING INPUT TO OR OUTPUT FROM SAID      │
│ GRAPHIC DISPLAY.                                                │
│                           200                                   │
└─────────────────────────────────────────────────────────────────┘
                              ↓
┌─────────────────────────────────────────────────────────────────┐
│ PROVIDING THE SECOND REAR MAJOR SURFACE WITH A SPEAKER THEREON. │
│                           210                                   │
└─────────────────────────────────────────────────────────────────┘
                                              ┌─────────────────────┐
                                              │ THE SECOND REAR     │
                                              │ MAJOR SURFACE       │
                                              │ COMPRISES A         │
                                              │ MICROPHONE          │
                                              │ POSITIONED THEREON. │
                                              │        220          │
                                              └─────────────────────┘
                              ↓
┌─────────────────────────────────────────────────────────────────┐
│ ASSEMBLING THE DEVICE SUCH THAT A USER WILL TURN THE DEVICE     │
│ AROUND AND ORIENT THE REAR MAJOR SURFACE AS THE FRONT SURFACE   │
│ DURING OPERATION OF TELEPHONE ACTIVE SPEAKING AND/OR            │
│ LISTENING MODES.                                                │
│                           215                                   │
└─────────────────────────────────────────────────────────────────┘
                              ↓
┌─────────────────────────────────────────────────────────────────┐
│ PROVIDING A FLIP MEMBER WHICH ROTATES TO OVERLAY THE GRAPHIC    │
│ DISPLAY DURING PERIODS OF NON-USE, AND ROTATES TO EXTEND        │
│ TOWARD THE REAR MAJOR SURFACE TO POSITION A MICROPHONE          │
│ INCLUDED LOCATED THEREON PROXIMATE A USER'S MOUTH DURING        │
│ TELEPHONE ACTIVE SPEAKING AND LISTENING MODES.                  │
│                           230                                   │
└─────────────────────────────────────────────────────────────────┘
```

*FIG. 10.*

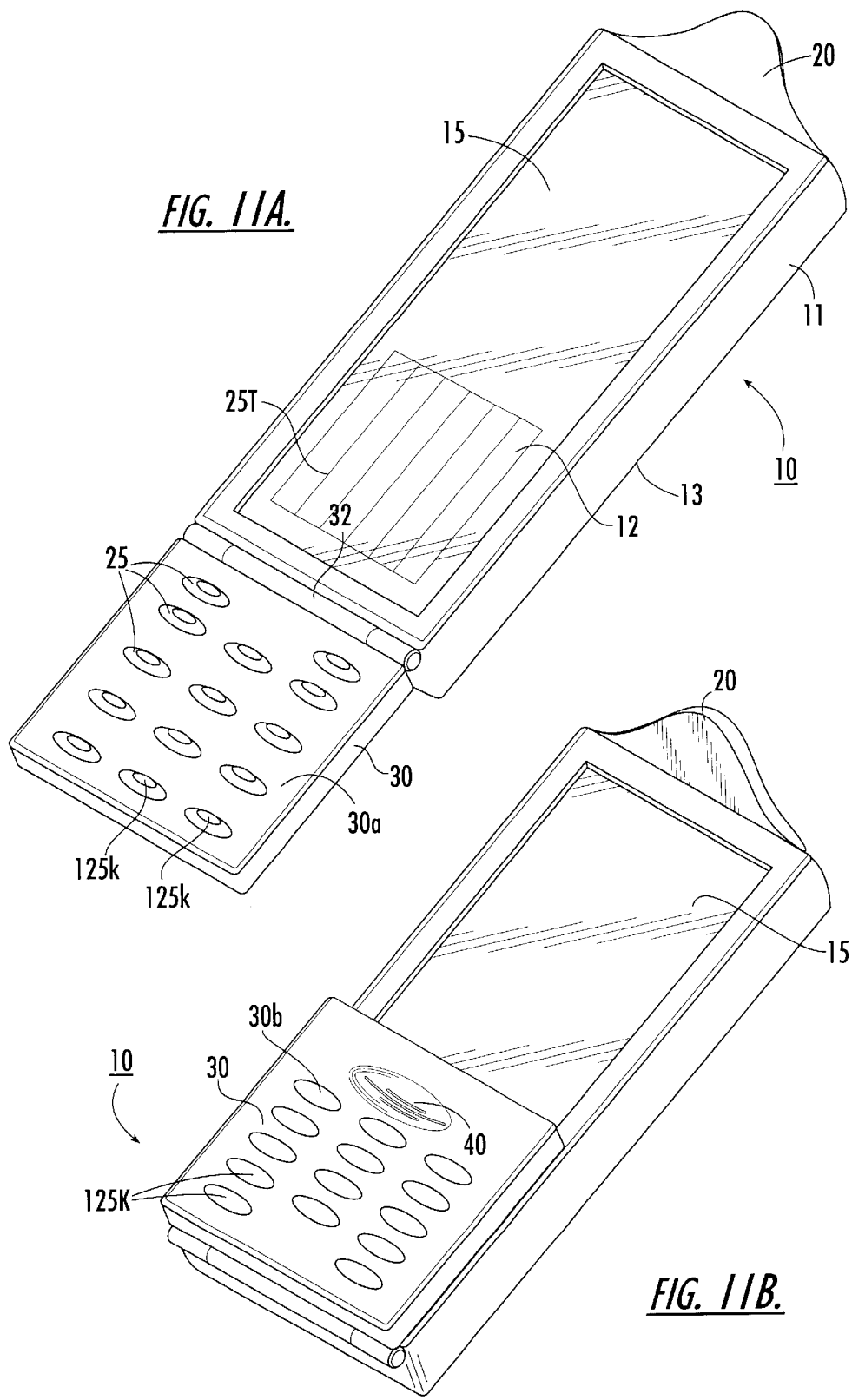

TURN AROUND CELLULAR TELEPHONE

FIELD OF THE INVENTION

The present invention relates generally to wireless communication devices such as wireless cellular and/or digital telephones.

BACKGROUND OF THE INVENTION

The evolution of wireless communication devices incorporating cellular/digital wireless telephones is undergoing two potentially conflicting trends. One trend is toward miniaturization of the cellular telephone body and the other is toward a demand for larger visual displays thereon. There is, therefore, a need to configure pervasive computing devices such as smaller, miniaturized, or "pocket-sized" wireless telephones in a manner which allows for larger displays over conventional devices.

SUMMARY OF THE INVENTION

The present invention addresses this need by redefining the roles of the front and rear primary surfaces of wireless communication devices. More particularly, the first or front primary surface of the wireless communication device (such as a cellular telephone) is dedicated to a large display surface while the rear primary surface of the device is configured to hold a speaker thereon. A microphone may be positioned on the rear face too, or can, alternatively, be located on a pivotable flip member. The associated keypad can be disposed on the rear surface, formed into the graphic display (such as via a touchscreen format), or a combination of both (dual keypads). Alternatively, a pivotable flip can include the keypad and even the microphone. During operation, a user can rotate or "turn" the device "around" (i.e., "turn around") to orient the desired input surface for use (forward face up for graphic display use and forward face disposed to the back or reversed for telephone use).

More particularly, a first aspect of the present invention is a "turn around" platform wireless communications device. The device includes a primary body having opposing forward and rear major surfaces. The forward major surface comprises a graphic display positioned thereon. The graphic display is configured such that it extends over a major portion of the area of the forward major surface. The rear major surface comprises a speaker positioned thereon. The device also includes a flip member pivotably engaged to the primary body such that it can rotate from a first closed position overlying the first forward surface to a second open position away from the forward major surface toward said rear major surface. The flip member is configured to rotate greater than about 180 degrees from the closed to the open position.

In one embodiment, the flip member has opposing top and bottom surfaces, and the flip member is oriented such that its top surface is located proximate to the graphic display when the flip member is closed to overlay the primary body, and a microphone is positioned on said flip member such that it is accessible to a user through the bottom surface in operation. The flip member may include a keypad on its top surface. Alternatively, or in addition, the graphic display can be configured to provide a touchscreen entry mode. If so, the flip member can include a plurality of guides operably associated with the graphic display to provide a touch screen entry thereon. Further, the rear major surface of the device can be configured with a keypad thereon.

In a preferred embodiment, the device includes an antenna connected to a top portion of the primary body. The antenna is configured to extend away from the rear major surface such that, when a user orients the device with the speaker adjacent his or her ear, the antenna is oriented away from the user.

Another aspect of the present invention is a turn around wireless communications device which includes a primary body having opposing forward and rear major surfaces. The forward major surface comprises a graphic display positioned thereon. The graphic display is configured such that it extends over a major portion of the area of the forward major surface. The rear major surface comprises a speaker positioned thereon.

The device also preferably includes a microphone which can be positioned on the rear major surface (on a bottom portion), or on a flip, such that it is proximate to the mouth of a user during telephone operation.

Yet another aspect of the present invention is directed to a method of manufacturing a wireless communications device having an operational platform which defines active operational roles for each of the two opposing forward and rear major surfaces. The method comprises the steps of: providing the first forward major surface to include a graphic display which extends to cover a major portion of the first major surface such that a user will orient the first forward major surface as the front surface during uses involving input to or output from the graphic display; providing the second rear major surface with a speaker thereon; and assembling the device such that a user will rotate the device to orient the rear major surface as the front surface during operation of telephone active speaking and listening modes.

In one embodiment, the method may include providing a flip member which rotates to overlay the graphic display during periods of non-use, and rotates to extend toward the rear major surface during telephone active speaking and listening modes. The flip member may be configured with a microphone that is positioned proximate to a user during telephone active listening and speaking modes.

In a preferred embodiment, the flip member is configured to provide a cover for the display surface to protect it during periods of non-use. Preferably, the microphone is positioned on the external surface of the flip member when the flip member is closed over the display face. In operation, the flip member opens and rotates more than about 180 degrees such that the microphone faces the rear of the cellular telephone, placing it in an operative position adjacent to the user's mouth.

Advantageously, the antenna can be mounted on the telephone such that it extends away from the user when the cellular telephone is in operation. The battery power source can be positioned intermediate the front and rear surfaces. The battery can be accessed by removing a cover panel, or by positioning it such that it is located between the front and rear portions of the telephone and accessible along at least one perimeter so that in operation, the battery can be changed or replaced by sliding it out from a perimeter edge of the device.

The invention is particularly suitable for pocket-sized wireless telephones or miniaturized pervasive computing devices which include wireless telephones.

BRIEF DESCRIPTION OF THE DRAWINGS

FIG. 1 is a front perspective view of a wireless communications device including a wireless telephone according to the present invention.

FIG. 2 is a front perspective view of the device shown in FIG. 1, illustrating the flip member closed to overlay at least a portion of the display face according to one embodiment of the present invention.

FIG. 6 is a rear perspective view of the cellular telephone shown in FIG. 5 with the flip member rotated to the open position.

FIG. 10 is a block diagram of one method of designing an operational platform for a wireless communications device which employs two active major surfaces, such that a user selectively turns one of the forward or rear major surfaces to the front during operation depending on its desired use modality according to the present invention.

FIG. 11A is a front perspective view of another embodiment of a wireless communications device with a keypad assembly configured to contact a touchscreen according to the present invention.

FIG. 11B is a front perspective view of the device shown in FIG. 11A, illustrating the flip member closed to expose user selectable key guides which overlay and can operably contact at least a portion of the display face (corresponding to an underlying touchscreen) according to one embodiment of the present invention.

DETAILED DESCRIPTION OF PREFERRED EMBODIMENTS

Figure 3:
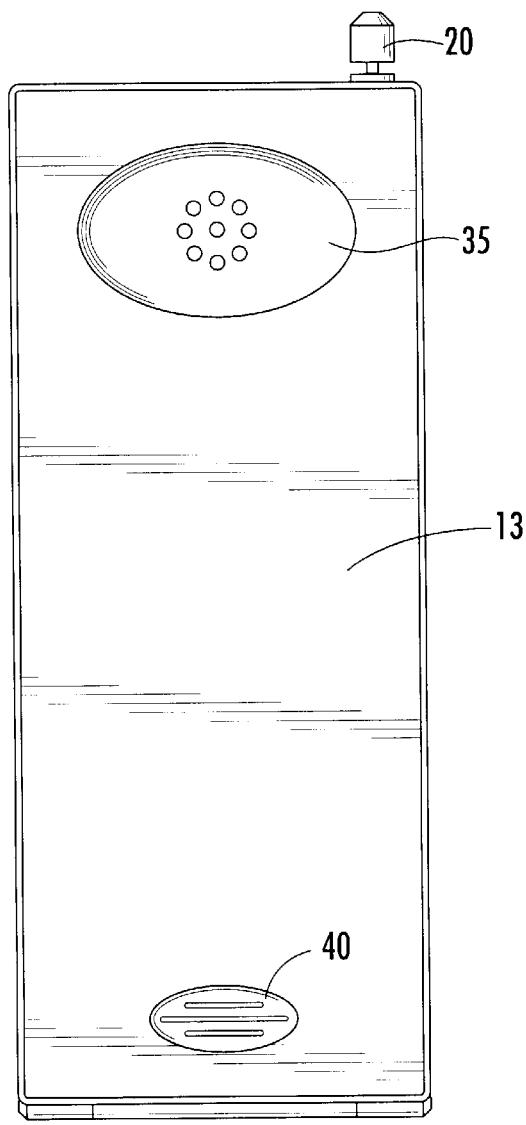
FIG. 3 is a rear view of a wireless communications device illustrating an alternate embodiment of the present invention wherein both a speaker and a microphone are located on the rear surface of the device according to the present invention.
Figure 4:
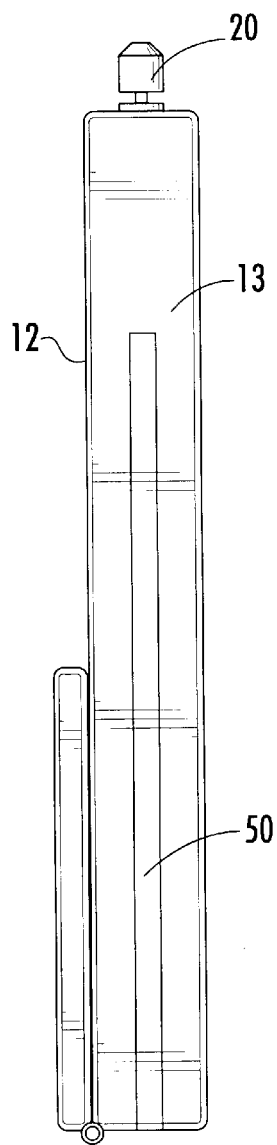
FIG. 4 is a side view of a wireless communications device similar to that shown in FIG. 3, but with a flip member according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thicknesses of layers and regions may be exaggerated for clarity. Like numbers refer to like elements throughout the description of the drawings.

Wireless communications systems and devices are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, (Gibson ed., CRC Press 1996).

Turning now to the figures, FIG. 1 illustrates a wireless communication device 10 according to one embodiment of the present invention. The wireless communication device 10 includes a primary body 11, a front or forward major surface 12, and an opposing a rear major surface 13 (FIG. 3). (The "forward" and "rear" surface designations are for description purposes only. It will be appreciated that, in practice, each of these surfaces can be the "front" surface or the "back" surface, and that indeed, each will act both as the back and the front, depending on the selected or activity/mode and the corresponding orientation of the device). The wireless communications device 10 also includes a keypad 25, an antenna 20, a speaker 35 (FIG. 3), and a microphone 40 (FIGS. 2, and 3). As shown in FIG. 1, the wireless communications device 10 also includes a flip member 30. The present invention is particularly suited for pocket-sized or palm sized wireless communications devices incorporating remote telephonic communications systems. Typically, these pocket or palm sized devices are less than about 8–10 inches in length and less than about 4 inches in width.

Referring to FIG. 2, the flip member 30 is configured to overlay at least a portion of the graphic display 15 when the flip member 30 is in a closed position to thereby protect the graphic display 15 from exposure to environmental hazards and abuses. As shown in FIG. 1, the flip member 30 is pivotably attached to the primary body 11 via a hinge mechanism 32 such that it is configured to rotate away from the graphic display 15 when it is opened. As is also shown in FIG. 1, the flip member 30 includes a keypad 25 on a first primary surface 30a thereof (the surface facing the graphic display 15 when the flip member 30 is in the closed position such that it overlays the primary body 11). FIG. 2 illustrates that the reverse side 30b of the flip member 30 includes the microphone 40. Of course, the flip member can be otherwise mounted to the body of the device. For example, the hinge mechanism 32 or pivot can also be located along a lower side portion of the device such that the flip member 30 can rotate about the side of the device toward the rear away from the graphic display (not shown).

Figure 5:
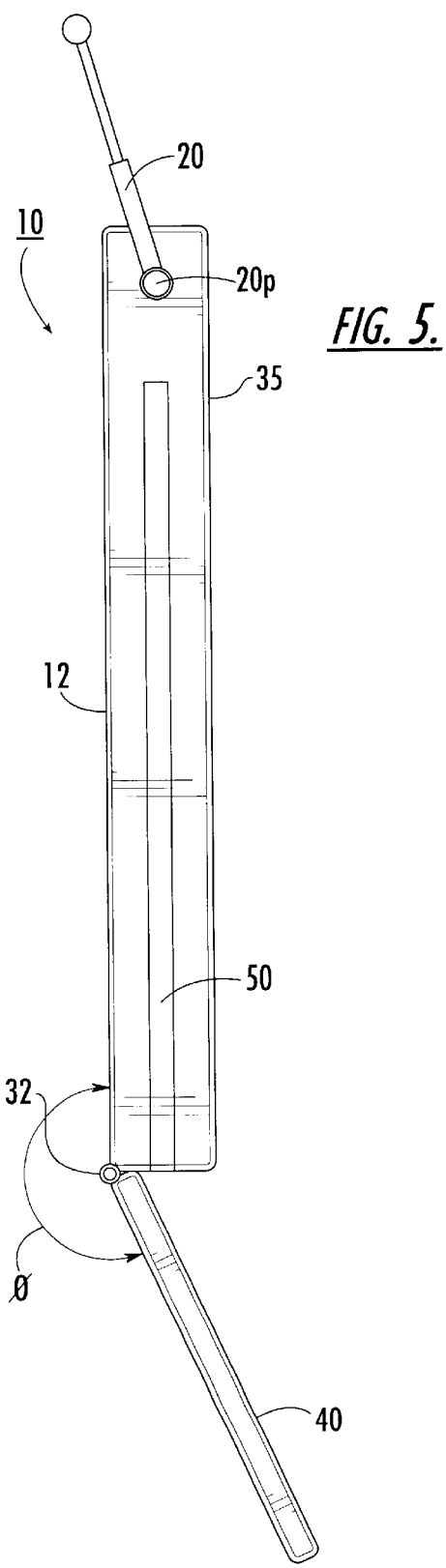
FIG. 5 is a side view of another embodiment of a wireless communication device such as a wireless or cellular telephone similar to that shown in FIG. 4. As shown, a flip member is opened during telephone operation such that it rotates away from the display face and toward the rear face, thus positioning a microphone proximate to the user according to one embodiment of the present invention.

FIG. 6 illustrates the rear major surface 13 with the speaker 35 positioned thereon. FIG. 5 illustrates the preferred angle of rotation ($\phi$) of the flip member 30 as it travels to the telephone use mode position. As shown, the flip member 30 travels through a rotation angle $\phi$ which is greater than about 180 degrees from its closed position. This rotation positions the microphone 40 such that the microphone faces the rear major surface 13 and positions the microphone 40 such that it is proximate to a user's mouth. Thus, as shown in FIG. 5, the speaker 35 and the microphone 40 are proximate the user when the device 10 is "turned around" from the orientation shown in FIG. 1. The display 15 is then oriented such that it faces away from the user and becomes the back surface of the device 10.

Figure 9:
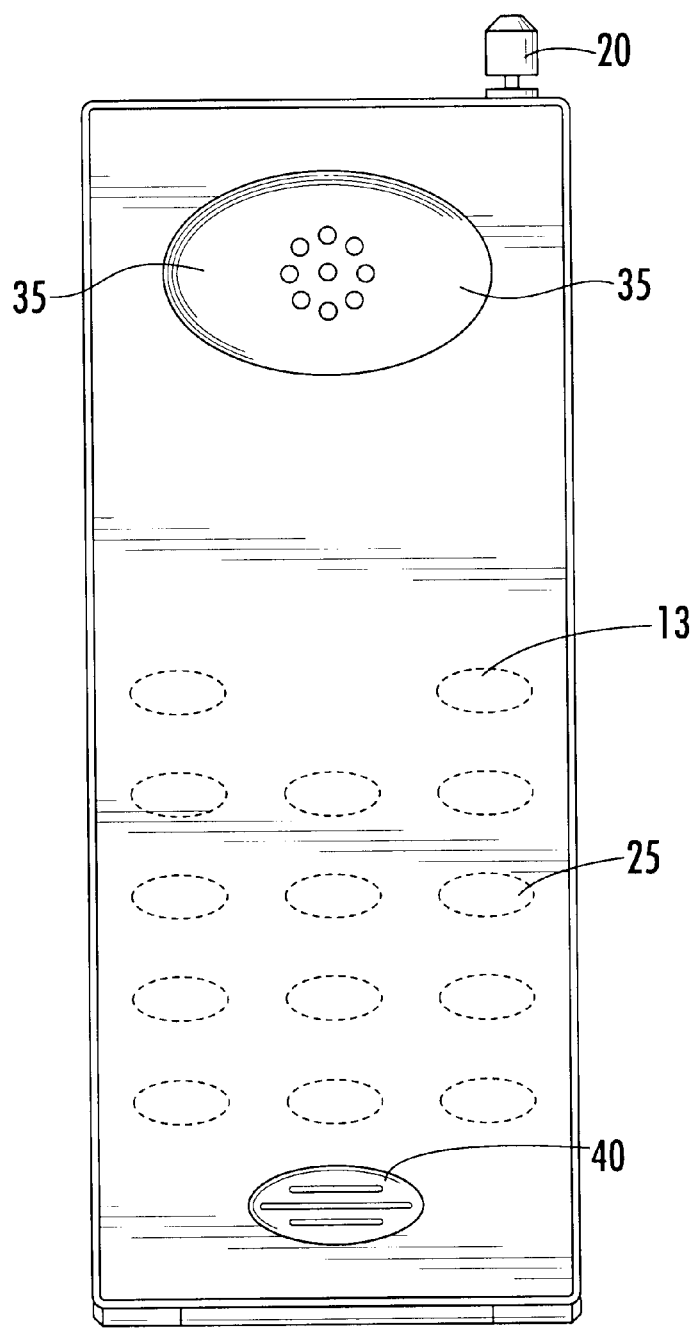
FIG. 9 is a rear view of another embodiment of a turn around wireless communications device according to the present invention illustrating a rear keypad in phantom lines.

FIGS. 3 and 9 illustrate another embodiment of a turn-around wireless communication device 10 according to the present invention. As shown in this embodiment, the microphone 40 and the speaker 35 are both positioned on the rear major surface 13 of the device 10. The wireless communication device can be configured both with or without the flip member 30. FIG. 9 illustrates that the keypad may also be included on the rear surface 13.

Referring again to FIG. 5, the antenna 20 is preferably configured such that it can be oriented away from a user when a user positions the device proximate to his/her body during telephone communication modes. FIG. 5 illustrates that the antenna 20 is attached to a top portion of the primary body 11 via a rotatable pivot 20p. Of course, the antenna 20 and/or its mounting mechanism can be alternatively configured such as, but limited to, those embodiments shown in FIGS. 1 through 4. The arrow along the top of the device 10 adjacent the antenna 20 in FIG. 2 represents that this antenna 20 is configured such that it is inclined toward the forward direction (in the direction of the display 15). Thus, when the device 10 is turned around, the antenna 20 is inclined away from the speaker 35 on the rear major surface 13, and, thus, a user when the device 10 is positioned adjacent the user during telephonic or remote speaking related communications.

The keypad 25 is configured to allow alphanumeric input via a user's touch or key selection. The keypad 25 can be configured in a number of ways as will be discussed further below. The keypad 25 is illustrated in FIG. 1 as a plurality of individual elongated oval keys 25k aligned according to industry standards for user convenience, but, it is to be noted that the present invention is not meant to be limited to the illustrated keypad layout, as other keypad layouts and configurations (including partial alpha numeric or full keyboard configurations) can also be employed.

In one embodiment, as shown in FIG. 1, the keypad 25 is carried on a first outer surface 30a of the flip member 30. Alternately, the keypad 25 can be configured to be located on the opposing outer surface 30b of the flip member 30, adjacent the microphone 40 (not shown). FIG. 7A illustrates that the keypad 25 can be integral to the display 15 as a touchscreen 25T. Various touchscreen software and associated locational grid hardware and operating structures are well known to those of skill in the art. See e.g. U.S. Pat. No. 3,857,022 to Rebane et al., entitled Graphic Input Device; U.S. Pat. No. 5,565,894 to Bates et al., entitled Dynamic Touchscreen Button Adjustment Mechanism. The contents of these documents are hereby incorporated herein by reference as if recited in full. As noted above, the keypad 25 can also be configured to be positioned on the rear major surface 13 of the device 10 (see for example, FIG. 9). Of course, the wireless communication device 10 can include a combination of the above keypad types and/or locations. For example, the device can include a first keypad such as a touchscreen 25T on the display 15 as shown in FIG. 7A and a second keypad 25 positioned on the rear major surface 13 as shown in FIG. 9, thereby providing a keypad oriented for convenient access for each use mode.

In one embodiment, as shown in FIGS. 11A and 11B, the display 15 is configured to provide the touchscreen 25T input and the flip member 30 is configured to provide keypad contact guides 125k therefor. That is, the flip member 30 can be used to provide a selectively engageable keypad entry which is configured to cooperate with the underlying touch pad or touchscreen 25T. Suitable keypad assembly structures are well known to those of skill in the art. See e.g. U.S. Pat. No. 5,917,906 to Thornton and U.S. Pat. No. 5,584,054 to Tyneski et al. The contents of these patents are hereby incorporated herein by reference as if recited in full. Generally described, in operation, a user touches or depresses a desired input key 125k, which then contacts a corresponding contact zone area on the underlying touchscreen 25T, and a signal is generated recognizing the geographic location of the contact zone and identifying the desired keyed data. The guides 125K can include protrusions or domes (upwardly or downwardly extending). If upwardly extending, the bottom guides 125K can be configured with bottom contact portions which are positioned to contact and provide a contact force corresponding to the selected key and activated relational contact zone area on the touchscreen (not shown). In any event, the guides 125k allow a user more definite tactile feedback and/or a more controlled key input.

As regards the display 15 itself, the graphic display 15 is preferably sized and configured to cover a major portion of the area defined by the forward surface 12. More preferably, the display 15 is configured and sized to extend to cover about 75% or more, and even more preferably about 90% or more, of the forward surface 12. Thus, in a preferred embodiment, the graphic display 15 is sized and configured to extend to cover substantially all of the forward surface 12. The forward surface 12 may also include operational keys, locks, and the like (not shown). Preferably, the display 15 is a ⅛ VGA display.

Figure 8A:
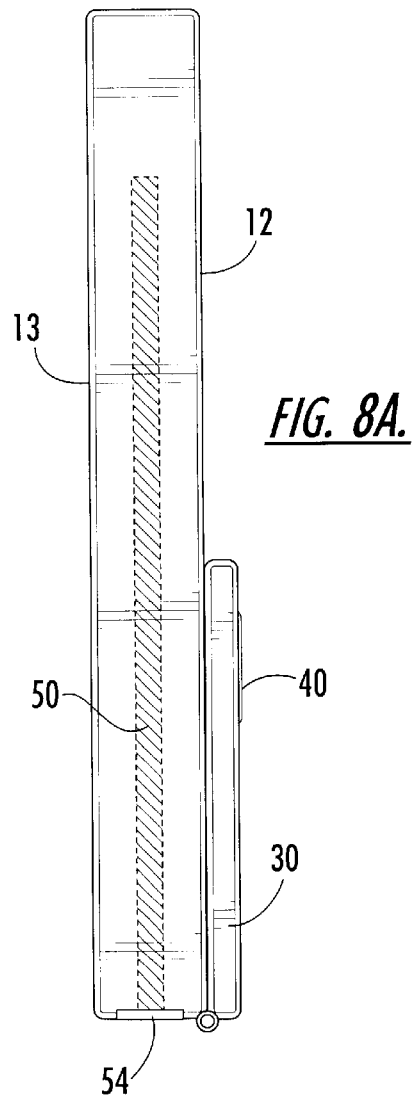
FIG. 8A is a side view of a wireless communications device according to the present invention illustrating one battery configuration according to the present invention.
Figure 8B:
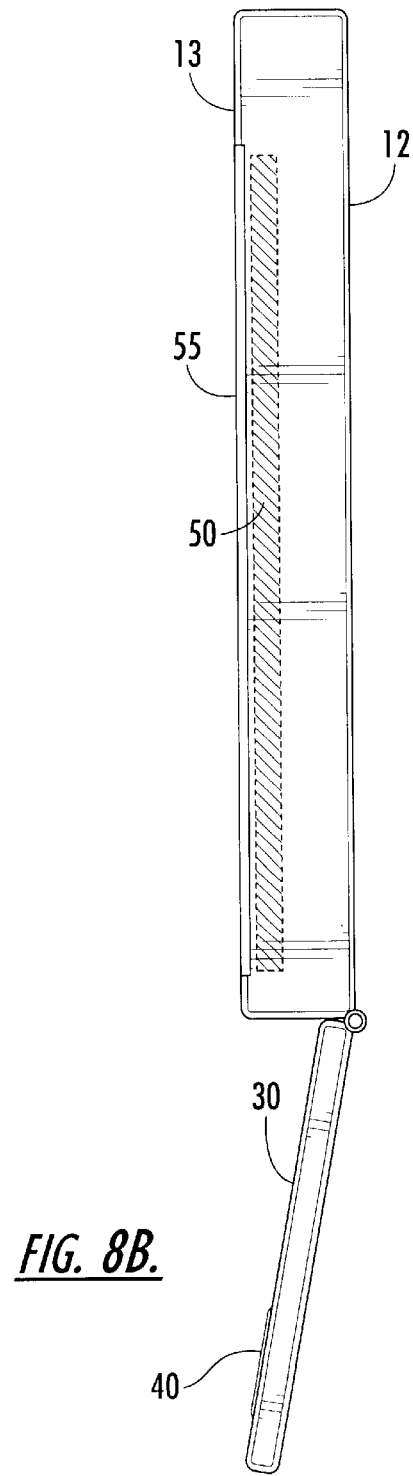
FIG. 8B is an opposing side view of a similar embodiment to that illustrated in FIG. 8A according to the present invention. This embodiment illustrates an alternate configuration of a battery accessible via a rear access panel.

The wireless communications device 10 also includes a battery 50 which is configured to power the internally positioned operating circuitry and other components of the device 10. The battery 50 is preferably located intermediate the two major (external) surfaces 12, 13 such as shown in FIG. 8A. A lower releasable access panel 54 allows the battery 50 to be slidably removed and replaced as needed. Similarly, FIG. 8B illustrates that the battery 50 is operably associated with a rear access panel 55. Again, the rear access panel 55 can be released to allow access to the battery 50. It will be appreciated that the battery 50 can be internally mounted in a number of ways and that the locations shown are provided for illustrative purposes and are not meant to limit the invention thereto.

Figure 7B:
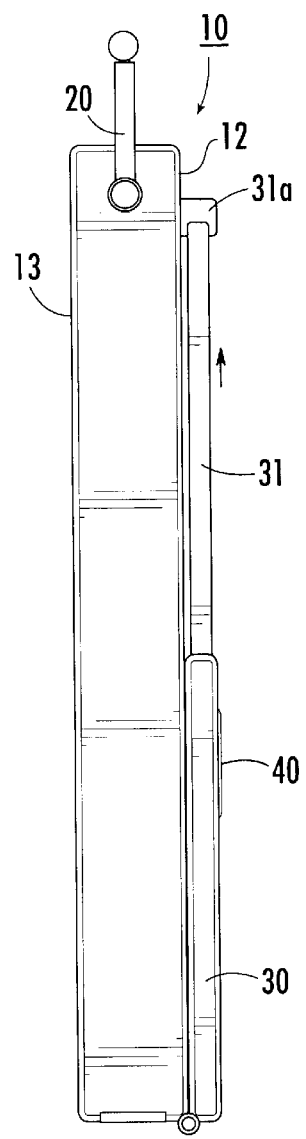
FIG. 7B is a side view of another embodiment of the present invention showing a flip member having a slidable cover portion similar to that shown in FIG. 7A.
Figure 7A:
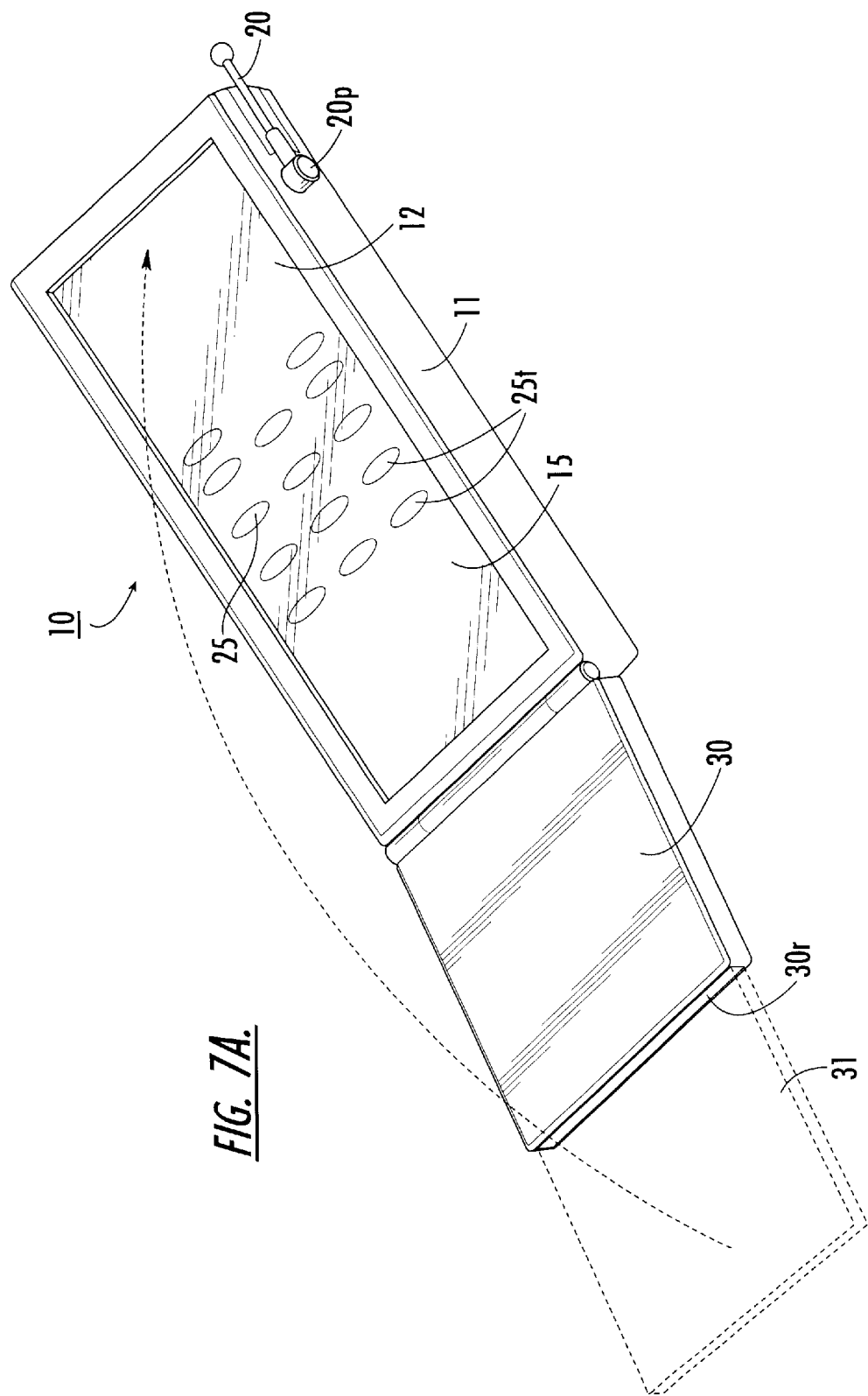
FIG. 7A is a front perspective view of yet another embodiment of the present invention. In this embodiment, a flip member includes a slidable cover portion (shown in phantom lines) which is extendable to overlay the display face.

FIGS. 7A and 7B illustrate another aspect of the present invention. As shown, the flip member 30 includes a slidable cover portion 31. As shown, the slidable cover portion 31 can extend and retract into a corresponding flip member receptacle 30r. Alternatively, the slidable cover portion 31 can be positioned to slide over one of the outer surfaces (to slidably engage with corresponding lateral sides thereof) to extend from and retract toward the flip member 30 (not shown). As shown in FIG. 7B, device 10 can also include an anchor portion 31a which is configured to lock the outer portion of the slidable cover 31 in place. Thus, when extended and closed over the display 15, the flip member 30 and the slidable cover portion 31 define a substantially contiguous cover to thereby overlay and protect the display 15 during periods of non-use. Preferably, if a slidable cover portion 31 is used, the electronic wiring associated with the operation of the components included on the flip member 30 is provided in the flip member 30 via printed traces to the hinge mechanism 32 to thereby reduce the likelihood of wiring interference in operation (not shown). Of course, other cover extension configurations can also be employed. For example, a second pivotable cover can be attached to the flip member 30 such that it folds against the flip member 30 when not rotated away to cover the display 15 (not shown).

FIG. 10 illustrates preferred method steps for manufacturing a portable communications device having an operational platform which defines active roles for each of the two opposing forward and rear major surfaces. The method includes the step of providing the first forward major surface which is configured to hold a graphic display thereon such that a user will orient the first forward major surface as the front surface during uses involving input to or output from the display (Block 200). The method includes the step of providing the second rear surface such that it is configured with a speaker thereon (Block 210). The device is assembled such that, in operation, a user will turn the device around or rotate the device such that the rear major surface is the front surface during operation of the telephone active speaking and listening modes (Block 215). A microphone can be positioned on the rear major surface (Block 220) or on a rotatable flip member (Block 230).

Advantageously, the present invention can now allow small wireless communication devices with larger displays over conventional devices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A turn around wireless communications device, comprising:
   a primary body having an associated length and opposing forward and rear major surfaces, wherein said forward major surface comprises a stationary graphic display positioned thereon, said graphic display configured such that it extends over at least about 75% of the area of said forward major surface, and wherein said rear major surface comprises a speaker positioned thereon; and
   a flip member pivotably engaged to an end portion of said primary body such that it can rotate from a first closed position overlying said first forward major surface to a second open talking position away from said forward major surface toward said rear major surface during active speaking use when held by a user, and wherein said flip member is configured to rotate greater than 180 degrees from said closed to said open talking position;
   wherein said flip member has opposing top and bottom surfaces, wherein said flip member is oriented such that said top surface faces said graphic display when said flip member is closed to overlay said primary body, and wherein said bottom surface comprises a microphone positioned thereon.

2. A turn around wireless communications device according to claim 1, wherein said flip member top surface comprises a keypad.

3. A turn around wireless communications device according to claim 2, wherein said rear major surface comprises a second keypad thereon.

4. A turn around wireless communications device according to claim 1, wherein said graphic display is configured to provide a touchscreen entry mode.

5. A turn around wireless communications device according to claim 1, wherein said graphic display is configured to allow touchscreen entry with defined contact zones thereon, wherein said flip member includes a plurality of individually selectable guides corresponding to said touchscreen contact zones in said graphic display, and wherein, in operation, said plurality of individually selectable guides are positioned to overlay said graphic display to provide keyed entry via said touchscreen.

6. A turnaround wireless communications device according to claim 1, further comprising an antenna connected to a top portion of said primary body, and wherein said antenna is configured to extend away from said rear major surface toward said front surface when a user orients said turnaround wireless communications device such that said speaker is adjacent the user's ear during operation.

7. A turn around wireless communications device according to claim 1, and wherein the primary body has an associated length and said flip member has an associated length, the flip member length being less than a major portion of the length of the primary body, and wherein said graphic display extends to cover about 90% of said forward major surface.

8. A turn around wireless communications device according to claim 7, wherein said graphic display is a ⅛ VGA.

9. A turn around wireless communications device according to claim 1, wherein said speaker is located on a top portion of said rear major surface.

10. A turnaround wireless communications device according to claim 1, wherein said flip member comprises an additional cover portion which is extendable to overlay said graphic display during periods of non-use to thereby provide protection therefor.

11. A turnaround wireless communications device, comprising:
   a primary body having opposing forward and rear major surfaces;
   a graphic display positioned on said forward major surface so that it is stationary in the turnaround wireless communications device, said graphic display sized and configured such that it extends over at least about 75% of the area of said forward major surface;
   a speaker positioned on a top portion of said rear major surface;
   a microphone located such that it is positioned proximate a user's mouth when the user has said speaker adjacent his or her ear; and
   a flip member with opposing top and bottom surfaces pivotably attached to an end portion of said primary body, wherein said flip member is oriented such that said top surface faces said graphic display when said flip member is closed to overlay said primary body, and wherein said microphone is positioned on the bottom surface of said flip member, and wherein the primary body has an associated length and said flip member has an associated length, the flip member length being less than a major portion of the length of the primary body.

12. A turn around wireless communications device according to claim 11, wherein said graphic display is configured to provide a touchscreen entry mode.

13. A turn around wireless communications device according to claim 11, wherein said rear major surface comprises a keypad thereon.

14. A turn around wireless communications device according to claim 11, wherein said device includes a first keypad defined by said graphic display and a second keypad located on said rear major surface.

15. A turn around wireless communications device according to claim 11, further comprising an antenna connected to a top portion of said primary body, and wherein said antenna is configured to extend away from said rear major surface toward said forward major surface when a user orients said turnaround wireless communications device such that said speaker is adjacent his or her ear during operation.

16. A turn around wireless communications device according to claim 11, wherein said graphic display extends to cover greater than about 90% of the area of said forward major surface.

17. A turn around wireless communications device according to claim 16, wherein said graphic display is a ⅛ VGA.

18. A turnaround wireless communications device according to claim 11, wherein said flip member includes a plurality of guides corresponding to said graphic display to provide touchscreen entry thereon.

19. A turnaround wireless communications device according to claim 11, wherein said flip member comprises an extendable supplemental cover portion which is extendable from said flip member to overlay said graphic display during periods of non-use to thereby provide protection therefor.

20. A method for manufacturing a wireless communications device with an operational platform which defines active operational roles for each of the two opposing forward and rear major surfaces on a primary body, comprising the steps of:

providing the first forward major surface to hold a stationary graphic display which has a length sufficient to cover at least about 75% of the first major surface such that a user will orient the first forward major surface as the front surface during uses involving input to or output from said graphic display;

providing the second rear major surface with a speaker thereon;

assembling said wireless communications device such that, in operation, a user will rotate said device to orient the rear major surface as the front surface during operation of telephone active speaking and listening modes; and providing a flip member which rotates to overlay said graphic display during periods of non-use, and rotates greater than 180 degrees from the non-use position to extend toward the rear major surface during telephone active speaking and listening modes, wherein said flip member has opposing top and bottom surfaces, and wherein said flip member is oriented such that said top surface faces said graphic display when said flip member is closed to overlay said primary body, and wherein said bottom surface comprises a microphone positioned thereon.

21. A method according to claim 20, wherein said wireless communications device is pocket-sized.

22. A method according to claim 20, wherein said microphone is positioned proximate to a user during telephone active listening and speaking modes.

23. A method according to claim 20, wherein the graphic display extends over at least about 90% of the area of said forward major surface.

* * * * *

UNITED STATES PATENT AND TRADEMARK OFFICE
CERTIFICATE OF CORRECTION

PATENT NO.    : 6,751,487 B1
DATED         : June 15, 2004
INVENTOR(S)   : Rydbeck et al.

It is certified that error appears in the above-identified patent and that said Letters Patent is hereby corrected as shown below:

<u>Title page,</u>
Item [56], References Cited, U.S. PATENT DOCUMENTS, should include the following references:
-- 5,468,948    11/1995    Koenck et al.
   6,009,336    12/1999    Harris et al.
   6,128,515    10/2000    Kabler et al. --
FOREIGN PATENT DOCUMENTS, should include the following references:
-- EP    EP0897236A2    17/1999
   EP    EP0932289A2    28/1999
   EP    EP0933908A2    04/1999
   EP    EP 0969641A1   05/2000 --
OTHER PUBLICATIONS, should include the following references:
-- PCT International Search Report for Int'l. Appln. No. PCT/US01/01372 mailed 27/07/2001. --

Signed and Sealed this

Second Day of August, 2005

JON W. DUDAS
*Director of the United States Patent and Trademark Office*